(No Model.)
I. B. KLEINERT.
ARMPIT DRESS SHIELD.
No. 345,595. Patented July 13, 1886.
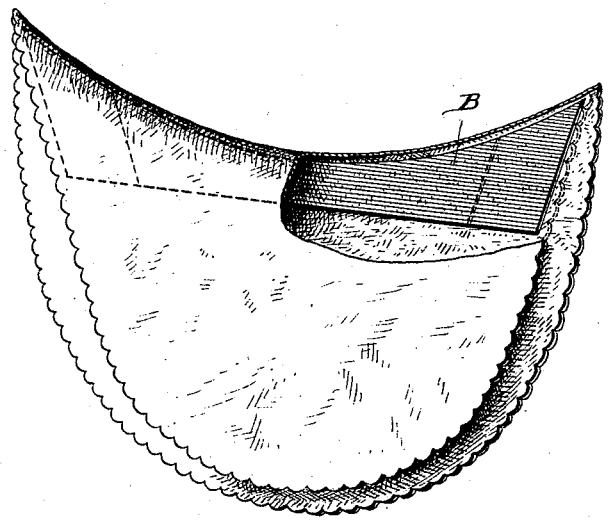
WITNESSES
F. L. Ouraud.
E. H. Bond.
INVENTOR
Isaac B. Kleinert
by T. J. W. Robertson
Attorney

UNITED STATES PATENT OFFICE.

ISAAC B. KLEINERT, OF NEW YORK, N. Y.

ARMPIT DRESS-SHIELD.

SPECIFICATION forming part of Letters Patent No. 345,595, dated July 13, 1886.

Application filed November 24, 1885. Serial No. 183,896. (No model.)

*To all whom it may concern:*

Be it known that I, ISAAC B. KLEINERT, a citizen of the United States, residing at New York, in the county and State of New York, have invented certain new and useful Improvements in Armpit-Shields, of which the following is a specification, reference being had therein to the accompanying drawing, which represents a perspective view of one of my shields with a part broken away.

This invention relates to that class of shields provided with a stay to keep the curve in shape, such as is shown in the application of Julius Janowitz, No. 169,519, but is intended more particularly for use with my shield patented October 23, 1883, although it may be applied to any other shields.

In the course of manufacturing the shields above referred to I have found that although the methods of preventing the change of curve shown in said patent and application serve a good purpose, and are decided improvements on anything of the kind before used, there is still a slight inherent tendency in the material of which the shield is made to straighten the curve, and especially is this so when the shield is made of two seamless sections. This tendency is fully overcome by my present invention, which consists, essentially, in providing a shield with a stay having its upper edge curved to fit the fold, and preferably straight on its lower edge, which stay I prefer to make of woven material cut lengthwise of the fabric, as goods so cut do not stretch to any appreciable extent, while if cut crosswise of the goods the stays will readily stretch. I may, however, make my stays out of some material other than woven fabric—such as parchment, vellum, parchment-paper, metallic foil, foil-covered paper, or other similar equivalent material formed without threads, and incapable of being seriously injured by the heat of the human body or the ordinary action of the climate.

In carrying out my invention I usually make my shield in the form shown in my patent above referred to, although I do not limit myself to such form of shield, as one may be employed having one or more seamless sections. On this I affix by any suitable cement, and preferably underneath, a stay, B, having its upper edge curved to correspond substantially with the edge of the curved fold of the shield, and preferably with its lower edge straight, although this is not so essential when the stay is made of parchment-paper, or some material formed without weaving or knitting. If woven material is used for the stay, unless it is stiffened in some manner to make it practically inelastic, it should have its lower edge cut straight and lengthwise with the goods, or substantially so. In some cases, however, I propose to use stays made of woven material stiffened with shellac or some similar substance, which would so unite the threads to each other as to become practically inelastic, in which case it is not so necessary that they should be cut lengthwise of the fabric.

In some cases I may make the shields with a short stay, as indicated by dotted lines; but I prefer to make it as shown in full lines.

I am aware that it has been proposed to provide dress-shields with gussets coated with gutta-percha; but this substance is easily softened by the heat generated under the arm, especially when very thin. I am also aware that the parts of shields have been joined by strips of cloth or other material coated with rubber; but as rubber is elastic it easily stretches, and hence would not prevent the fibers moving on each other, and I should not therefore consider such strips as formed of inelastic material.

What I claim as new is—

1. A dress-shield provided with a seamless section and a separate stay having its longitudinal fibers arranged in straight lines across the shield, and its upper edge curved substantially coincident with the curve of the fold of the shield, substantially as described.

2. A dress-shield provided with a separate stay having one of its edges cut parallel with the threads of the material of which it is formed, said edge being in a straight line across the shield, and at varying distances from the curve of the folded edge, substantially as described.

3. A dress-shield provided with a stay having its upper edge curved and substantially coincident with the curve of the fold of the shield, and its lower edge straight, substantially as described.

In testimony whereof I affix my signature, in presence of two witnesses, this 23d day of November, 1885.

ISAAC B. KLEINERT.

Witnesses:
JOS. S. MICHAEL,
JOSEPH B. LYMAN.